(12) United States Patent
Riedel

(10) Patent No.: US 11,148,493 B2
(45) Date of Patent: *Oct. 19, 2021

(54) WHEEL SUSPENSION

(71) Applicant: EMM! SOLUTIONS GMBH, Weil der Stadt (DE)

(72) Inventor: Max Riedel, Lorch (DE)

(73) Assignee: EMM! SOLUTIONS GMBH, Weil der Stadt (DE)

( * ) Notice: Subject to any disclaimer, the term of this patent is extended or adjusted under 35 U.S.C. 154(b) by 86 days.

This patent is subject to a terminal disclaimer.

(21) Appl. No.: 16/497,448

(22) PCT Filed: Feb. 9, 2018

(86) PCT No.: PCT/EP2018/053333
§ 371 (c)(1),
(2) Date: Sep. 25, 2019

(87) PCT Pub. No.: WO2018/177642
PCT Pub. Date: Oct. 4, 2018

(65) Prior Publication Data
US 2020/0101806 A1    Apr. 2, 2020

(30) Foreign Application Priority Data

Mar. 29, 2017    (DE) .................... 10 2017 106 810.4

(51) Int. Cl.
*B60G 3/20*        (2006.01)
*B60G 7/00*        (2006.01)
(Continued)

(52) U.S. Cl.
CPC .............. *B60G 3/20* (2013.01); *B60G 7/001* (2013.01); *B60G 7/006* (2013.01); *B60G 15/068* (2013.01);
(Continued)

(58) Field of Classification Search
CPC .......... B60G 3/20; B60G 7/001; B60G 7/006; B60G 2200/144; B60G 2200/44;
(Continued)

(56) References Cited

U.S. PATENT DOCUMENTS

| 4,798,396 | A | * | 1/1989 | Minakawa | ............... | B60G 3/26 |
| | | | | | | 280/124.138 |
| 5,022,673 | A | * | 6/1991 | Sekino | ..................... | B60G 3/20 |
| | | | | | | 280/124.138 |

(Continued)

FOREIGN PATENT DOCUMENTS

| DE | G 83 34 546 U1 | 5/1985 |
| DE | 60 2004 002 248 T2 | 8/2007 |

(Continued)

*Primary Examiner* — Laura Freedman
(74) *Attorney, Agent, or Firm* — Norman B. Thot

(57) ABSTRACT

A wheel suspension includes an axle limb which supports a wheel. The axle limb includes a first steering axle which provides a first steering angle in a specified range for the wheel, and components for connecting the axle limb to a support structure. At least one of the components includes a second steering axle which provides a second steering angle which is different than the first steering angle provided by the first steering axle. The second steering axle is selectively releasable. The components for connecting the axle limb to the support structure form a double transverse link axle which includes an upper traverse link and a lower traverse link. A support tube is arranged at a chassis-side end portion of each of the upper traverse link and the lower traverse link of the double transverse link axle. The support tube is pivotable about the second steering axle.

5 Claims, 8 Drawing Sheets

(51) Int. Cl.
    *B60G 15/06*     (2006.01)
    *B60K 7/00*     (2006.01)
    *B62D 7/14*     (2006.01)
    *B62D 7/08*     (2006.01)

(52) U.S. Cl.
CPC .............. *B60K 7/00* (2013.01); *B60K 7/0007* (2013.01); *B62D 7/08* (2013.01); *B62D 7/14* (2013.01); *B60G 2200/1422* (2013.01); *B60G 2200/44* (2013.01); *B60G 2204/422* (2013.01); *B60K 2007/0092* (2013.01)

(58) Field of Classification Search
CPC ...... B60G 2204/1484; B60G 2204/422; B60G 2206/50; B60G 2500/40; B60K 7/00; B60K 7/0007; B60K 2007/0092; B62D 7/06; B62D 7/08; B62D 7/14; B62D 5/0418
See application file for complete search history.

(56) References Cited

U.S. PATENT DOCUMENTS

| | | | |
|---|---|---|---|
| 6,406,036 B1 * | 6/2002 | Laurent | B60G 3/01 280/124.103 |
| 6,675,925 B2 | 1/2004 | Takahashi | |
| 6,688,620 B2 * | 2/2004 | Serra | B60G 3/265 280/124.135 |
| 7,222,863 B2 * | 5/2007 | Deal | B60G 3/01 280/124.135 |
| 7,357,400 B2 * | 4/2008 | Serra | B60G 7/008 280/124.134 |
| 7,793,946 B2 * | 9/2010 | Vaxelaire | B60G 3/26 280/5.521 |
| 7,793,955 B2 * | 9/2010 | Suzuki | B60G 3/26 280/124.135 |
| 8,066,292 B2 * | 11/2011 | Mueller | B60G 7/006 280/93.503 |
| 2003/0155735 A1 | 8/2003 | Takahashi et al. | |
| 2005/0017472 A1 | 1/2005 | Kondo et al. | |
| 2018/0251152 A1 | 9/2018 | Neu et al. | |
| 2019/0329621 A1 * | 10/2019 | Budweil | B60G 3/20 |
| 2020/0062064 A1 * | 2/2020 | Riedel | B60G 3/20 |

FOREIGN PATENT DOCUMENTS

| | | |
|---|---|---|
| DE | 10 2013 216 029 A1 | 2/2015 |
| DE | 10 2015 203 632 A1 | 9/2016 |
| DE | 10 2015 209 595 A1 | 12/2016 |
| JP | H01-172066 A | 7/1989 |
| JP | 2005-53471 A | 3/2005 |
| JP | 2009-90698 A | 4/2009 |
| JP | 5141170 B2 | 2/2013 |
| WO | WO 2016/039312 A1 | 3/2016 |

* cited by examiner

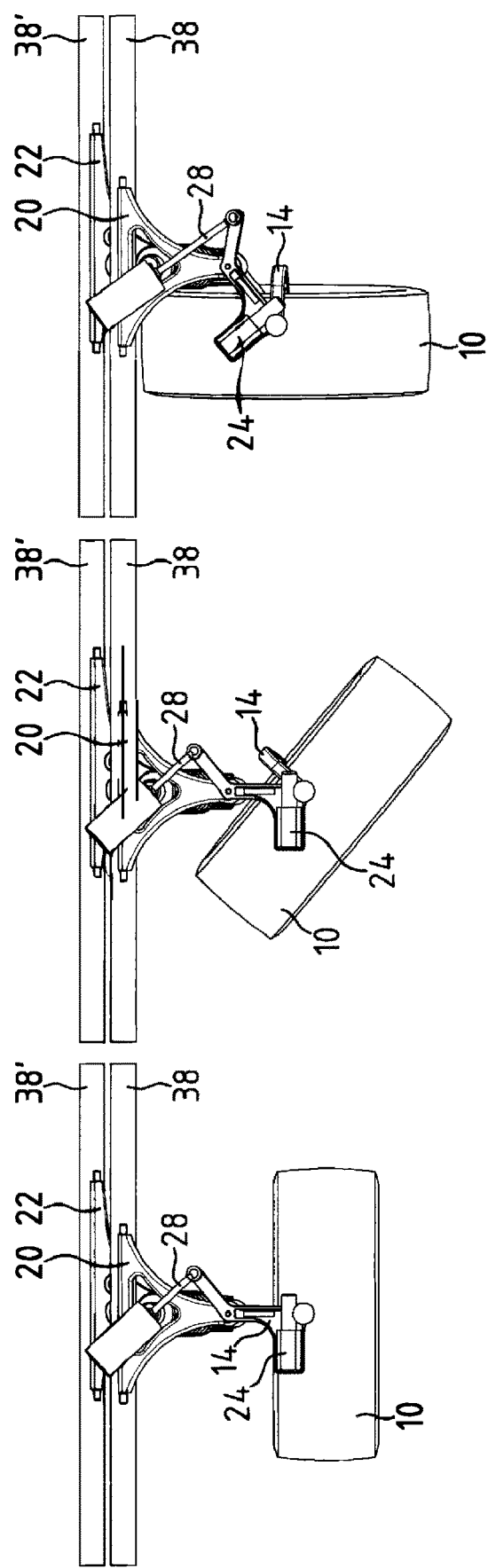

WHEEL SUSPENSION

CROSS REFERENCE TO PRIOR APPLICATIONS

This application is a U.S. National Phase application under 35 U.S.C. § 371 of International Application No. PCT/EP2018/053333, filed on Feb. 9, 2018 and which claims benefit to German Patent Application No. 10 2017 106 810.4, filed on Mar. 29, 2017. The International Application was published in German on Oct. 4, 2018 as WO 2018/177642 A1 under PCT Article 21(2).

FIELD

The present invention relates to a wheel suspension, in particular for a vehicle body, comprising an axle limb which supports a wheel and having a first steering axle for the wheel, the first steering axle allowing a steering angle in a specified range, and comprising components for connecting the axle limb to a support structure.

BACKGROUND

Standard vehicle bodies are currently predominantly used in automotive technology whose individual geometry is based on the specific load requirements of the respective vehicle model.

Known wheel suspensions for personal and utility vehicles include the following:
- McPherson, wheel-guiding suspension strut with additional single or double transverse links (optional wishbone suspension links) as a large base or a small base
- Multi-link axle
- Composite steering arm or coupling link axle
- Trailing arm and rigid axles Only one axle, i.e., the front axle, is normally steered; rear axles are partially designed to be co-steered but are rarely used in practice. An actively steering rear axle that enables a large steering angle similar to the front axle is to be found only in custom solutions and not in large series production. The maximum possible steering angle at the front axle is limited by the geometry of the selected wheel suspension.

A disadvantage of the limited steering angle of known wheel suspensions is, for example, that a vehicle parked parallel to a road requires a relatively large parking space for maneuvering, and the utilization of available parking space, which is becoming more and more limited, is therefore not optimal. Traffic flow is also impeded or stopped by the usually required reverse parking. A vehicle also cannot rotate on a point. A turning circle measures between 9 and 13 meters in diameter depending on vehicle class.

SUMMARY

An aspect of the present invention is to provide a suitable driving mechanism geometry which reduces the parking space required for vehicles and to achieve a largely exact, space-saving, and automated parking at right angles and with only a minimal hindrance of traffic.

In an embodiment, the present invention provides a wheel suspension which includes an axle limb which is configured to support a wheel. The axle limb comprises a first steering axle which is configured to provide a first steering angle in a specified range for the wheel, and components for connecting the axle limb to a support structure. At least one of the components comprises a second steering axle which is configured to provide a second steering angle which is different than the first steering angle provided by the first steering axle. The second steering axle is configured to be selectively releasable. The components for connecting the axle limb to the support structure form a double transverse link axle which comprises an upper traverse link and a lower traverse link. A support tube is arranged at a chassis-side end portion of each of the upper traverse link and the lower traverse link of the double transverse link axle. The support tube is configured to be pivotable about the second steering axle.

BRIEF DESCRIPTION OF THE DRAWINGS

The present invention is described in greater detail below on the basis of embodiments and of the drawings in which:

FIG. 3 shows the wheel suspension according to FIG. 1 from above where the wheel is in a position pointing straight ahead in the direction of travel;

FIG. 4 shows the wheel suspension according to FIG. 1 from above where the wheel has a maximum steering angle of about 40° about the first steering axle;

FIG. 5 shows the wheel suspension according to FIG. 1 from above where the wheel has an angle of approximately 90° with respect to the longitudinal axis of the vehicle;

DETAILED DESCRIPTION

Figure 1:
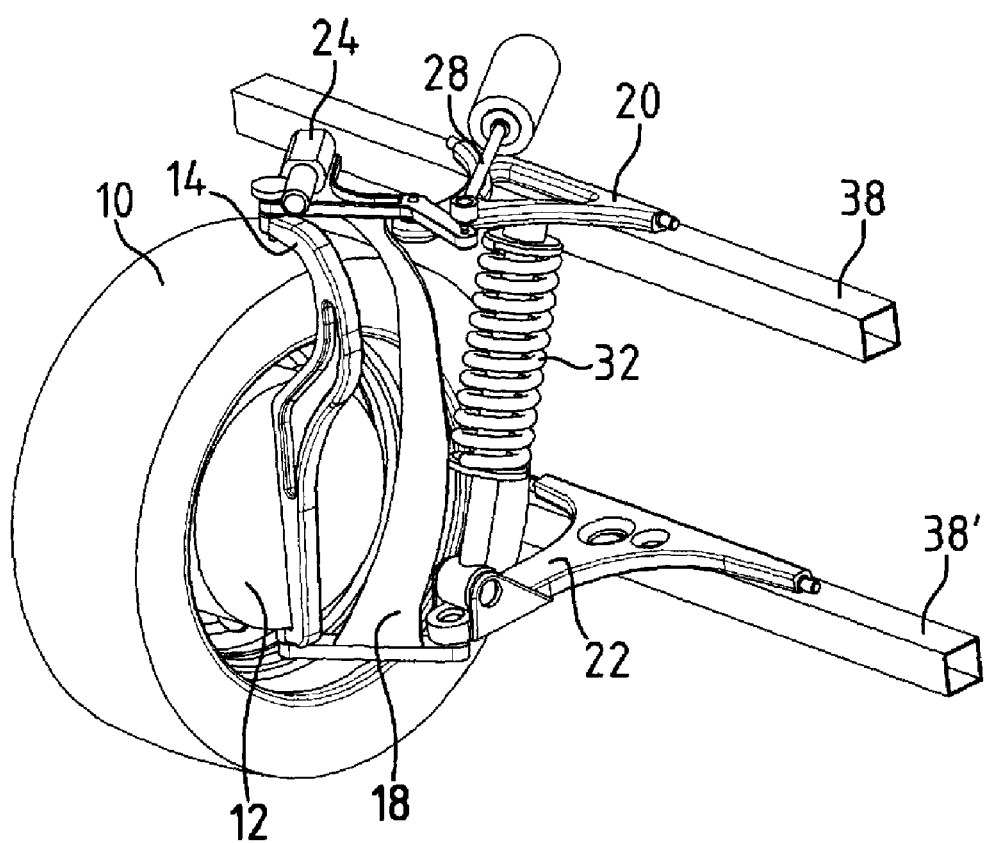
FIG. 1 shows a first exemplary embodiment of a wheel suspension with double transverse links in a perspective view.

The basic concept of the present invention is to adjust the wheel-specific steering angle to 90° (or more) to the right and to the left by integrating an additional second steering axle into a conventional steering wheel suspension between the rotary bearing of an axle limb and the connection of the wheel suspension to the vehicle or transport means. According to the present invention, at least one of the components has a selectively releasable second steering axle in order to produce a steering angle other than the one defined by the first steering axle.

Even if the present invention is described below on the basis of a vehicle body, the field of application of the present invention is not restricted thereto. In addition to being used in vehicle engineering, the solution of the present invention can also be implemented in any other mobile application. A use is, for example, generally conceivable in the transport of goods or persons. As examples, mention should here be made in particular to utility vehicles and transport means for disabled persons or vehicles for logistics in special environments such as, for example, storage spaces. Vehicles can also be used in interior spaces and have special structures such as a flexible lifting crane, a fork lift, a conveyor belt transporter (the body being transported on the vehicle), and the like.

In a pure driving mode of a vehicle, the vehicle is guided conventionally by fine rotational movements of the outer axle limb assigned to the steering axle (about 40° steering angle in both directions). For parking or transverse driving at lower speeds, the second, inner, i.e., body-side, steering axle is unlocked from its driving position and increases the total steering angle by superimposing the angles of rotation of both axles up to a wheel angle transverse to the longitudinal direction of the vehicle.

This type of wheel suspension can be used not only for the front axle, but also for all other vehicle axles (all-wheel steering). Control of the steering system via the second, inner steering axle can be exerted both on the individual wheel suspension (single-wheel steering via corresponding actuators) and via steering kinematics which couples both wheels of an axle and is driven by only one actuator.

Enabling a steering angle of up to 90° or more in both directions via an additional, inner steering axle offers two essential advantages:

The steering roll radius (distance of wheel contact point to a theoretical point of intersection of the outer steering axle and roadway) can be designed to be small or even zero; the influence of driving or braking torque on steering in the driving mode is thus very low.

By suitable selection of the position of the second, inner steering axle, the wheel rotates into the wheelhouse parallel to the transverse link in the smallest possible space; the wheel opening need not be increased, which results in a space-saving arrangement and more design freedom.

In addition to a conventional steerable axle (for example, multiple links, double transverse link, McPherson strut suspension, pendulum axle, longitudinal link axle), in an embodiment of the present invention, a further joint having six degrees of freedom (for example, a supporting joint) can, for example, be introduced between the rotary bearing of the axle limb and the connection of the wheel suspension to the vehicle or transport means, thus dividing the transverse link into an outer short and an inner long transverse link. The bearing of the first, outer steering axle is replaced by a purely rotary bearing (for example, a tapered roller bearing). In addition to rotation about the second, inner axle, the bearing between a short and a long transverse link assumes the task of a wheel suspension and therefore must be equipped with six degrees of freedom.

Implementation in a double wishbone axle is accomplished by integrating the upper and lower short wishbone links or coupling them as a unit via a connector. The spring damper unit is rotatably mounted on the inner, long wishbone link and is supported directly on the body.

Implementation in a McPherson strut suspension takes place analogously to the double wishbone axle, with only the lower wishbone link being divided. The upper point of the second, inner steering axle is the articulation point between the suspension strut and the body.

In an embodiment of the present invention, an actuator for rotating the wheel about the first steering axle can, for example, be arranged on the axle limb. The actuator can be designed as an electric motor or as a hydraulic or pneumatic unit. The mechanically very complex transmission of steering commands via a conventional steering gear can thus be avoided.

In an embodiment of the present invention, the components for connecting the axle limb to the support structure can, for example, be designed as a double wishbone axle. In this case, a support for the axle limb is advantageously provided, which is arranged pivotably about the second steering axle on an upper and on a lower wishbone link of the double wishbone axle. Alternatively, a support tube for the wishbone links, said support tube being pivotable about the second steering axle, can be arranged on end regions of an upper and a lower wishbone link of the double wishbone link on the side of the support structure.

In an embodiment of the present invention, the components for connecting the axle limb to the support structure are designed as a McPherson axle.

Since the second steering axle can, for example, not be used in normal driving operation at higher speeds, it can, for example, have a locking mechanism which can be released via a mechanical, electrical, hydraulic, or pneumatic actuating element.

Since the transmission of drive forces to the wheel in the suspension according to the present invention would be very complicated mechanically, a wheel hub motor can, for example, be arranged as a drive on the wheel.

In an embodiment of the present invention, the suspension of the present invention allows additional or alternative functions and applications:

Elimination of the steering actuator on the inner axle: the upper short transverse link is omitted. By locking and opening the lower intermediate joint, the additionally required steering angle of 90° relative to the driving direction can be accomplished by the wheel drive only.

Reduction of track width: by an equally dimensioned but opposite steering angle of both steering axles (40° to the left for the outer axle, 40° to the right for the inner axle), the steering effect is magnified while the track width is reduced.

Redundant brake/emergency braking: in some circumstances, an additional mechanical brake can be dispensed with or brake failure can be compensated by the steering system. Service braking is accomplished via the wheel hub motor (recuperation brake); emergency braking is additionally supported by an adjustment of the wheels in the toe-in. Or in the event of failure of the brake, a braking torque is generated by a mutual steering of the wheels.

Forces and torques are measured on the bearing of the inner axis of rotation, and the forces and torques on the wheel are deduced from these measurements. With the aid of evaluation electronics, operating cases, load spectra, roadway conditions, tire characteristics, and the coefficient of friction are determined as relevant vehicle characteristics.

The present invention will be explained in more detail below under reference to an embodiment shown schematically in the drawings.

Figure 2:
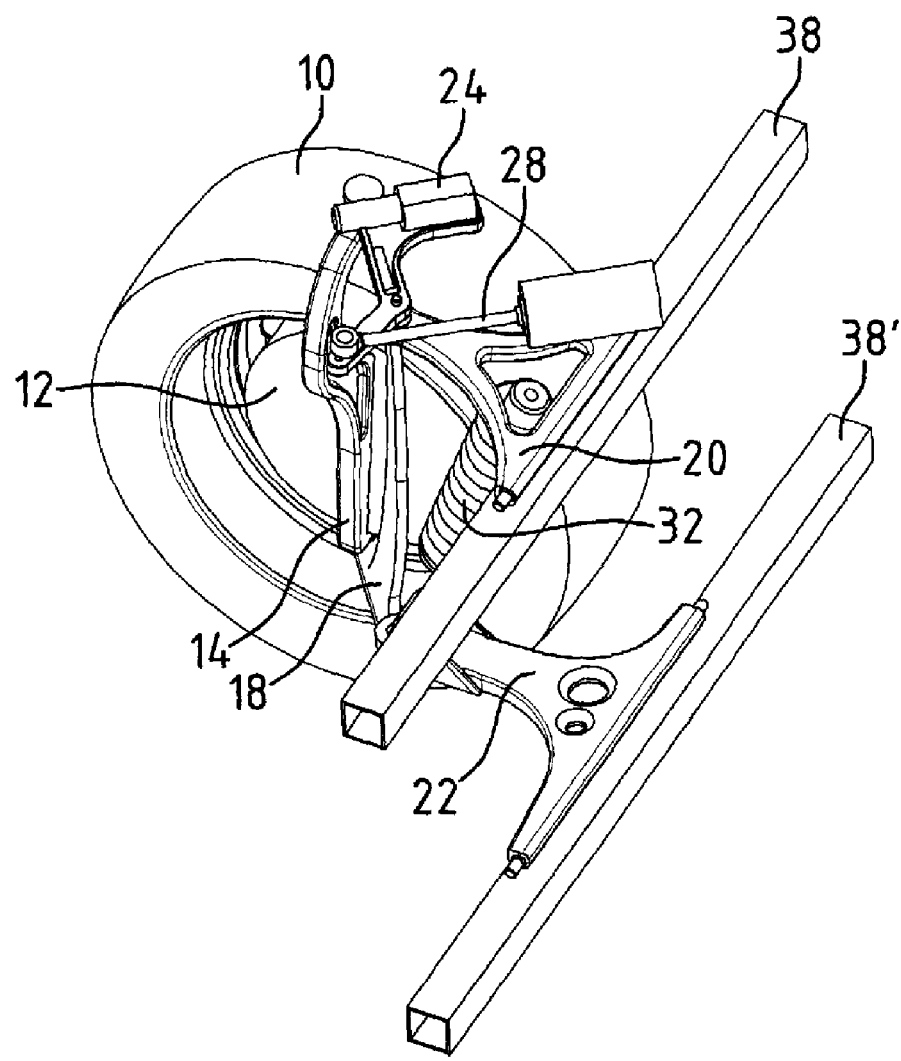
FIG. 2 shows the wheel suspension according to FIG. 1 in a perspective view rotated by 90°.

The wheel suspension illustrated in FIGS. 1 and 2 essentially comprises a wheel 10 with a wheel carrier 12 which is designed as a wheel hub motor, having an axle limb 14 carrying the wheel and having a first steering axle 16 (FIG. 6), a support 18 for the axle limb 16, an upper wishbone/triangular transverse link 20, a lower wishbone/triangular traverse link 22, an actuator 24 arranged on the axle limb 14 for steering the wheel 10 about the first steering axle 16, tapered roller bearings 26, 26' arranged at the top and at the bottom between the axle limb 14 and the support 18, a link 28 for rotating the support 18 about a second steering axle 30 (FIG. 6), a spring-damper unit 32, a locking mechanism 34 for locking the second steering axle 30 in the driving mode, and support bearings 36, 36' (FIG. 6) arranged at the top and at the bottom between the support 18 and the wishbone/triangular traverse links 20, 22. A vehicle chassis is symbolically indicated by struts 38, 38', on which the upper and lower wishbone/triangular traverse links 20, 22 are pivotably fastened. In FIGS. 1 and 2, the wheel 10 is rotated both about the first steering axle 16 and the second steering axle 30 so that a total steering angle of approximately 90° with respect to the longitudinal direction of the vehicle is achieved. If all available wheels are steered in such a way, a vehicle can be moved transversely to a road, such as for parking.

FIG. 3 shows the wheel 10 in a position pointing straight ahead in the direction of travel. FIG. 4 shows the wheel 10 with a maximum steering angle of about 40° about the first steering axle 16, for example, during cornering. The second steering axle is here locked. FIG. 5 shows the wheel 10 at an angle of approximately 90° with respect to the longitudinal axis of the vehicle. The second steering axle 30 is unlocked in this case and its rotational angle adds to the rotational angle of the first steering axle 16.

Figure 6:
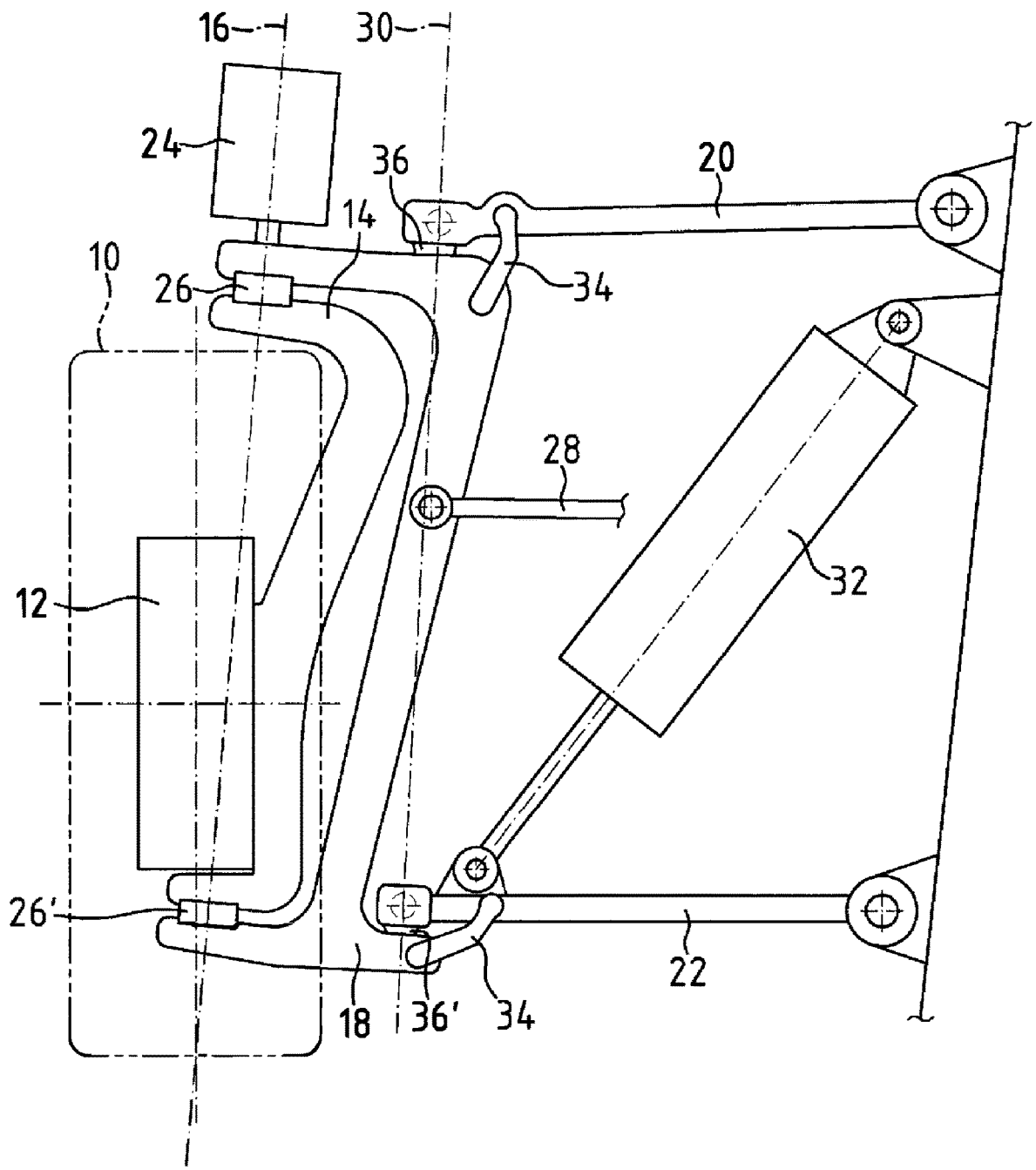
FIG. 6 shows a schematic side view of the wheel suspension device according to FIG. 1.
Figure 9:
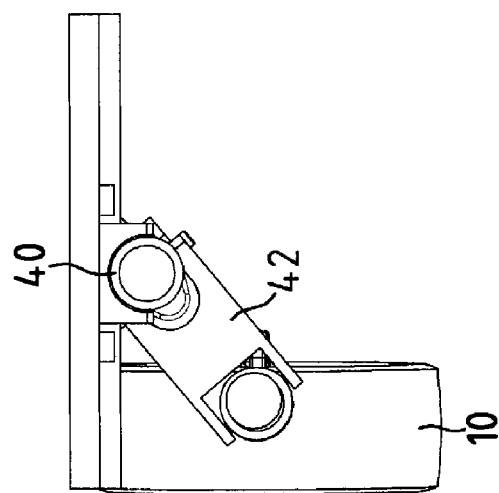
FIG. 9 shows a view from above of an alternative embodiment of a wheel suspension with double transverse links where the wheel is pivoted both about the first steering axle and the second steering axle and is at an angle of approximately 90° to the longitudinal axis of the vehicle.
Figure 8:
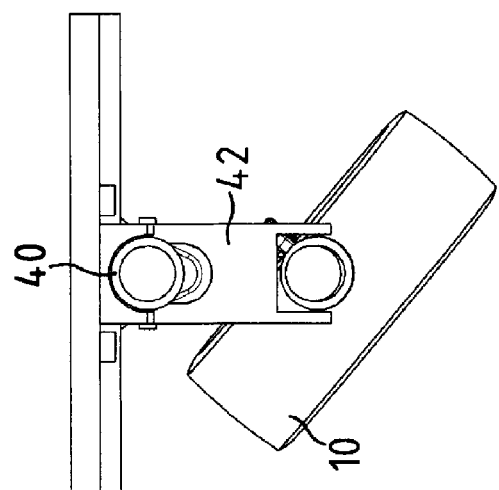
FIG. 8 shows a view from above of an alternative embodiment of a wheel suspension with double transverse links where the wheel is pivoted about the first steering axle.
Figure 7:
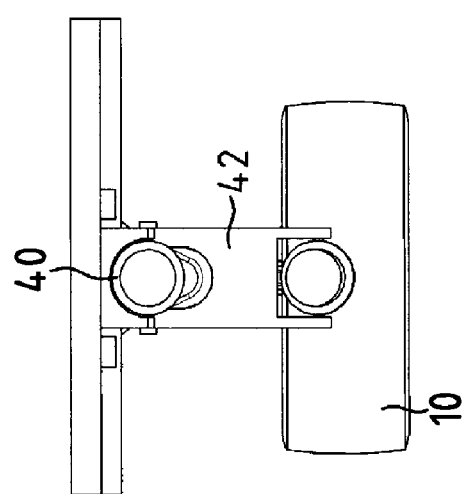
FIG. 7 shows a view from above of an alternative embodiment of a wheel suspension with double transverse links where the wheel is straight in the direction of travel.

FIGS. 7 to 9 show a plan view of an embodiment of a double transverse link axle in which, instead of a support 18 for the axle limb 14 (FIGS. 1 to 6), a support tube 40 arranged on the chassis-side ends of the upper and lower transverse links 42, 44 contains the second steering axle 30. FIGS. 7 to 9 correspond to FIGS. 3 to 5, respectively, of the first embodiment. In FIG. 7, the wheel 10 is straight in the direction of travel, in FIG. 8, the wheel 10 is pivoted about the first steering axle 16, and in FIG. 9, the wheel 10 is pivoted both about the first steering axle 16 and second steering axle 30 and is at an angle of approximately 90° to the longitudinal axis of the vehicle.

Figure 10:
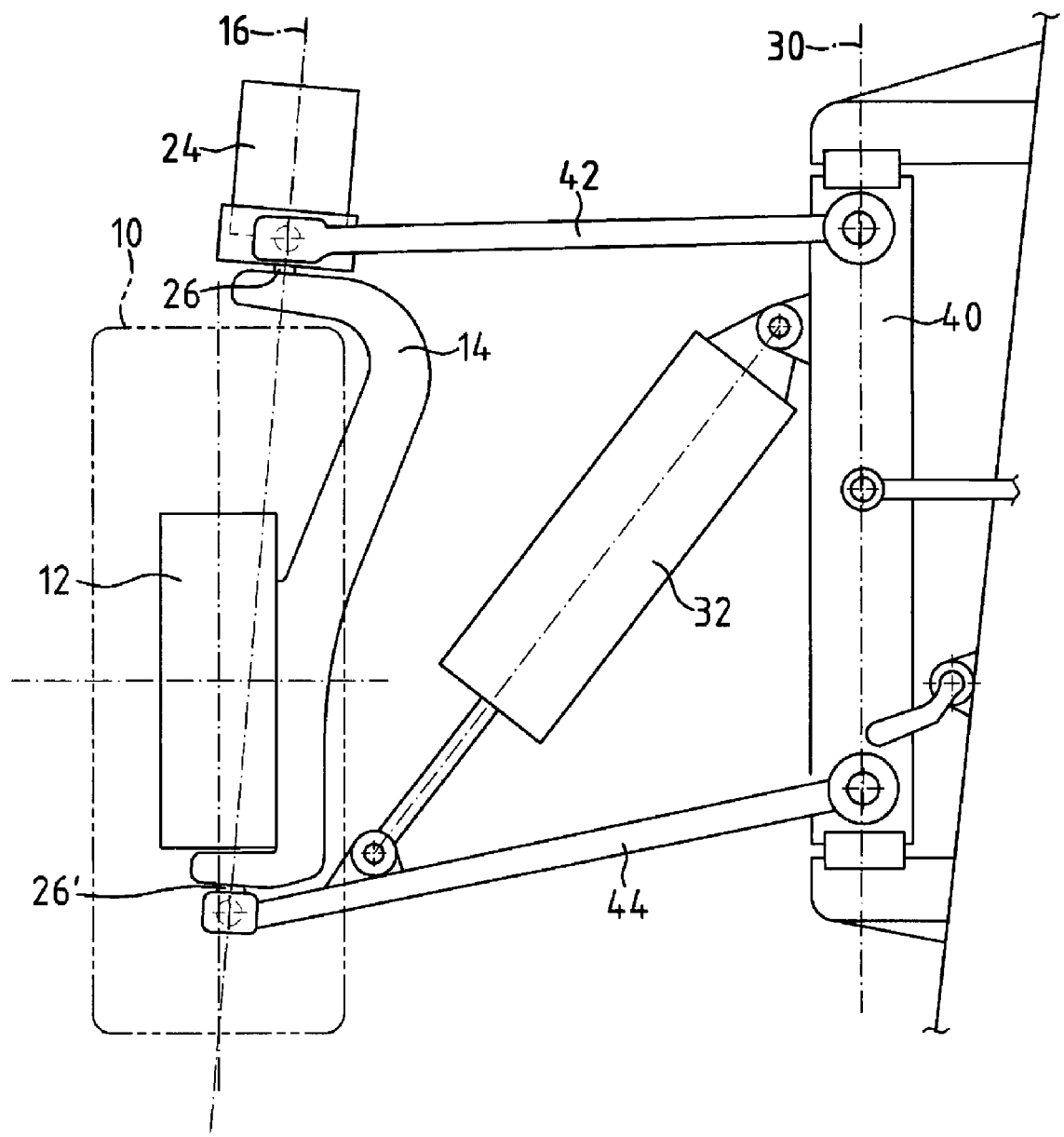
FIG. 10 shows a schematic side view of the wheel suspension according to FIGS. 7 to 9.

FIG. 10 shows a schematic side view of the embodiment illustrated in FIGS. 7 to 9, in accordance with FIG. 6. Identical parts are here provided with the same reference numerals. The difference here is essentially the use of the support tube 40 as a support for the upper and lower transverse links 42, 44. The second steering axle 30 runs close to the vehicle chassis through the support tube 40. To the extent that no impeding vehicle components are in the way, this embodiment theoretically permits a steering rotation of the wheel by 360°.

Figure 11:
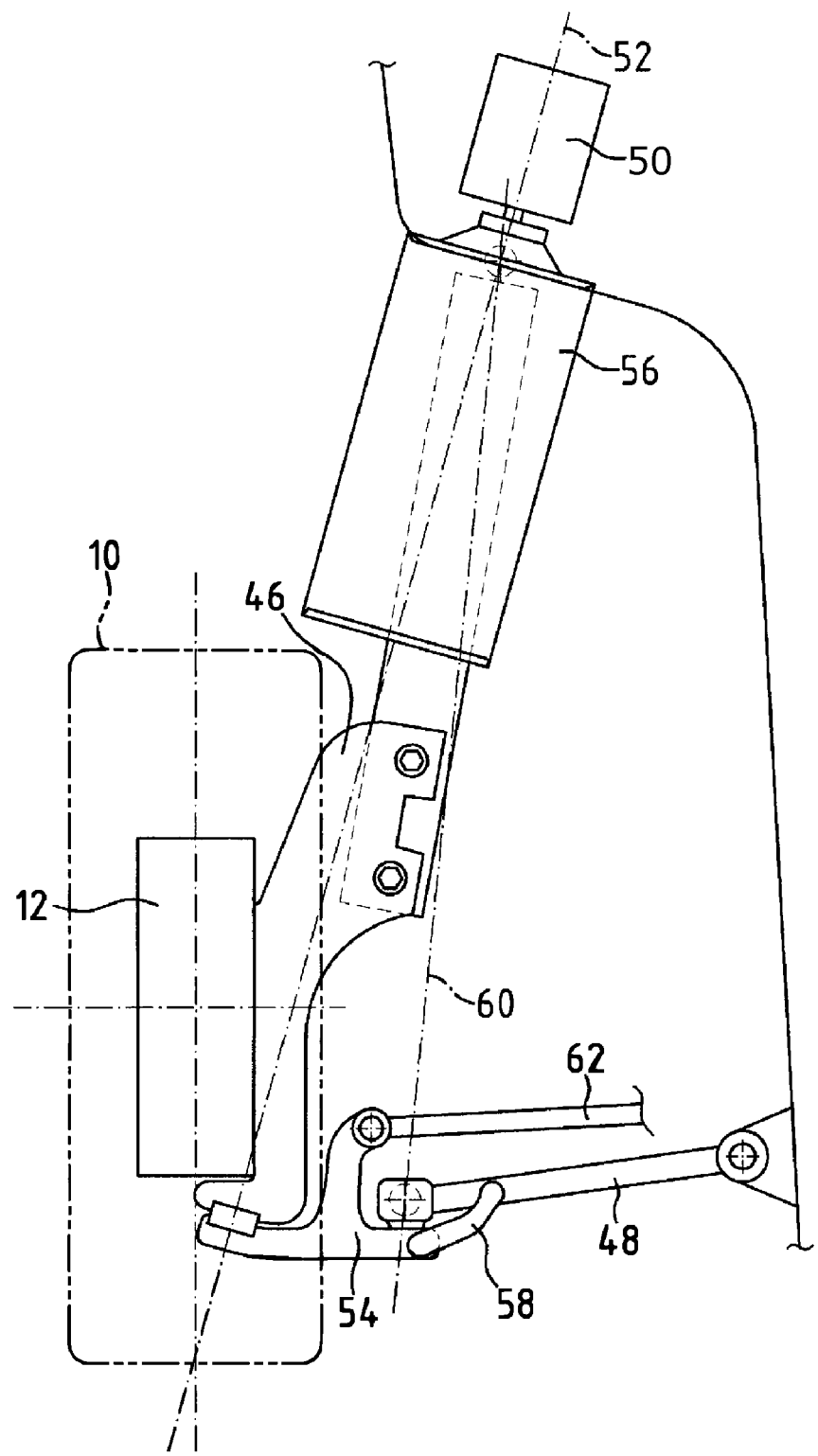
FIG. 11 shows a schematic side view of a McPherson wheel suspension.

FIG. 11 shows a first embodiment of a McPherson wheel suspension in a schematic side view according to FIGS. 6 and 10. This wheel suspension essentially comprises the wheel 10 with the wheel carrier 12, an axle limb 46, a lower transverse link 48, an actuator 50 for rotating the wheel 10 about a first steering axle 52, a short link 54 as the lower intermediate piece, a spring-damper unit 56, a locking mechanism 58 for locking the second steering axle 60, and a link 62 for rotating the wheel 10 about the second steering axle 60.

Figure 12:
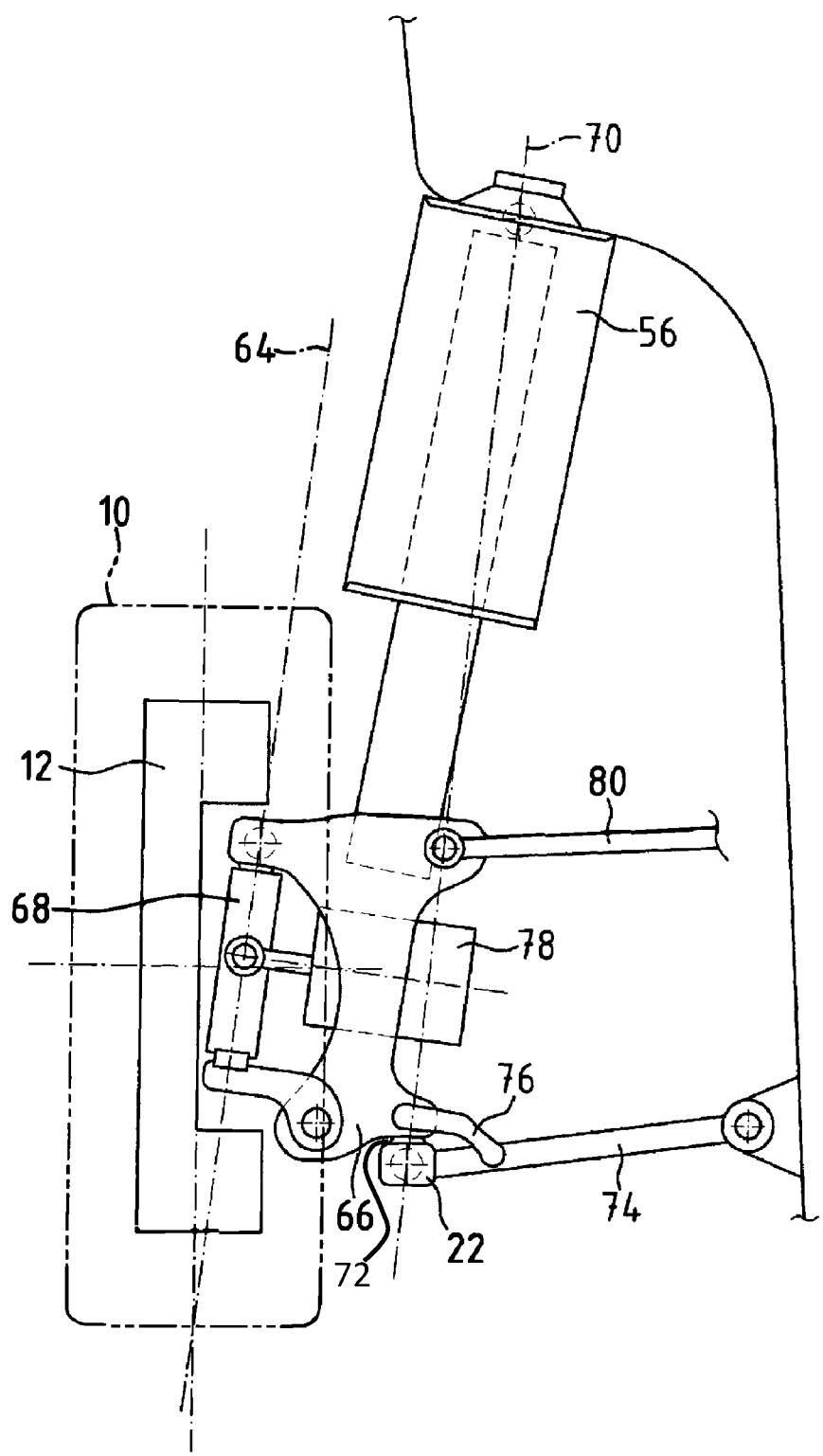
FIG. 12 shows a schematic side view of an alternative McPherson wheel suspension.

FIG. 12 shows a second embodiment of a McPherson wheel suspension in schematic side view according to FIGS. 6, 10, and 11. The first steering axle 64 here runs through a support tube 68 arranged on an axle limb 66. The second steering axle 70 extends through the upper linkage of the spring-damper unit 56 and a support bearing 72 of a lower transverse link 74. The second steering axle can be locked by a locking mechanism 76. The steering rotation of the wheel 10 about the first steering axle 64 takes place via a linear actuator 78. The second steering axle 70 is articulated via an upper link 80.

The following should be noted in summary: the present invention relates to a wheel suspension, in particular for a vehicle body, comprising an axle limb 14, 46, 66 which supports a wheel 10 and having a first steering axle 16, 52, 64 for the wheel 10, the first steering axle 16, 52, 64 allowing a steering angle in a specified range, and comprising components 18, 20, 22; 40, 42, 44; 48, 56; 56, 74 for connecting the axle limb 14, 46, 66 to a support structure 38, 38'. In order to allow a steering angle of 90° or more to be reached, at least one of the components 18, 20, 22; 40, 42, 44; 48, 56; 56, 74 has a selectively releasable second steering axle 30, 60, 70 in order to produce a steering angle other than the one defined by the first steering axle 16, 52, 64.

The present invention is not limited to embodiments described herein; reference should be had to the appended claims.

What is claimed is:

1. A wheel suspension comprising:
    an axle limb which is configured to support a wheel, the axle limb comprising,
        a first steering axis which is configured to provide a first steering angle in a specified range for the wheel, and
        components for connecting the axle limb to a support structure; and
    a support tube,
    wherein,
    at least one of the components comprises a second steering axis which is configured to provide a second steering angle which is different than the first steering angle provided by the first steering axis,
    the second steering axis is configured to be selectively releasable,
    the components for connecting the axle limb to the support structure form a double transverse link axle which comprises an upper transverse link and a lower transverse link,
    the support tube is arranged at a chassis-side end portion of each of the upper transverse link and the lower transverse link of the double transverse link axle, the support tube being configured to be pivotable about the second steering axis, and
    a longitudinal axis of the support tube defines the second steering axis so that the support tube is simultaneously pivotable both about the second steering axis and about the longitudinal axis of the support tube.

2. The wheel suspension as recited in claim 1, wherein the wheel suspension is for a vehicle body.

3. The wheel suspension as recited in claim 1, further comprising:
    an actuator arranged on the axle limb, the actuator being configured to rotate the wheel about the first steering axis.

4. The wheel suspension as recited in claim 3, wherein the actuator is an electric motor, a hydraulic unit, or a pneumatic unit.

5. The wheel suspension as recited in claim 1, wherein a wheel hub motor is arranged on the wheel as a drive.

* * * * *